(12) United States Patent
Okano et al.

(10) Patent No.: US 6,592,455 B1
(45) Date of Patent: *Jul. 15, 2003

(54) GAME DEVICE FOR DISPLAYING GAME INPUT OPERATIONS ON THE DISPLAY

(75) Inventors: Tetsu Okano, Tokyo (JP); Tadashi Kagawa, Tokyo (JP)

(73) Assignee: Sega Enterprises, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/406,828

(22) Filed: Sep. 28, 1999

Related U.S. Application Data (62) Division of application No. 08/778,349, filed on Jan. 3, 1997, now Pat. No. 6,001,017, which is a division of application No. 08/294,811, filed on Aug. 25, 1994, now Pat. No. 5,649,861.

(30) Foreign Application Priority Data

Aug. 25, 1993 (JP) .............................. 5-210219
Aug. 15, 1994 (JP) .............................. 6-191376

(51) Int. Cl.[7] .............................................. A63F 13/00
(52) U.S. Cl. ................................... 463/8; 463/31
(58) Field of Search ........................ 463/8, 30, 31, 463/36, 37, 38, 43, 44; 345/156, 157, 158; 273/440.1, 459, 460

(56) References Cited

U.S. PATENT DOCUMENTS

| | | | | |
|---|---|---|---|---|
| 4,353,552 A | * | 10/1982 | Pepper, Jr. .................. | 273/148 |
| 4,720,789 A | * | 1/1988 | Hector et al. ................ | 364/410 |
| 4,817,950 A | * | 4/1989 | Goo ............................ | 273/438 |
| 4,925,189 A | * | 5/1990 | Braeuniq ................. | 273/148 B |
| 5,139,261 A | * | 8/1992 | Openiano ............... | 273/438 X |
| 5,162,781 A | * | 11/1992 | Cambridge ............. | 345/158 X |
| 5,229,756 A | * | 7/1993 | Kosugi et al. .......... | 273/438 X |
| 5,288,078 A | * | 2/1994 | Capper et al. .......... | 273/438 X |
| 5,363,120 A | * | 11/1994 | Drumm ...................... | 345/158 |
| 5,394,168 A | * | 2/1995 | Smitt, III et al. ........ | 345/158 X |
| 5,405,152 A | * | 4/1995 | Katanics et al. ............ | 273/438 |
| 5,414,256 A | * | 5/1995 | Gurner et al. .......... | 364/410 X |
| 5,421,590 A | * | 6/1995 | Robbins ..................... | 273/148 |
| 5,442,168 A | | 8/1995 | Gurner et al. ............. | 250/221 |
| 5,444,462 A | * | 8/1995 | Wambach .................. | 345/158 |
| 5,483,261 A | * | 1/1996 | Yasutake ................ | 345/158 X |

OTHER PUBLICATIONS

Operation Manual of "JOYMECHA FIGHT" with English Translation, 1993 Nintendo.

Article in Family Computer with English Translation, undated.

* cited by examiner

*Primary Examiner*—Stephen F. Gerrity
*Assistant Examiner*—John Paradiso
(74) *Attorney, Agent, or Firm*—Dickstein Shapiro Morin & Oshinsky LLP (57) ABSTRACT

A game device comprises operational input means 30, 40 for inputting operational signals supplied by operation of game players, game control means 10 for controlling a game, based on the operational signals of the operational input means 30, 40, and game display means 20 for displaying the game controlled by the game control means 10, the operational signals of the operational input means 40 being displayed by the game display means 20. The game player can confirm game operations they made. As a result, the game player can relatively readily see their game operations they made without stress given to them.

50 Claims, 7 Drawing Sheets

GAME DEVICE FOR DISPLAYING GAME INPUT OPERATIONS ON THE DISPLAY

CROSS REFERENCE TO RELATED APPLICATIONS

This application is a divisional of U.S. application Ser. No. 08/778,349, filed on Jan. 3, 1997, now U.S. Pat. No. 6,001,017, which is a divisional of U.S. application Ser. No. 08/294,811, filed on Aug. 25, 1994, now U.S. Pat. No. 5,649,861, which are hereby incorporated by reference.

BACKGROUND OF THE INVENTION

The present invention relates to a game device comprising operational input means for inputting operational signals produced by operation of a player of a game, game control means for controlling the game, based on the operational signals of the operational input means, and game display means for displaying the game controlled by the game control means.

Game centers are popular as amusement facilities easily enjoyed at hand, and improved game devices come out one after another. Contents of games played on the game devices become increasingly sophisticated and complicated. As game contents become more sophisticated and complicated, operations by players are increasingly complicated. A considerably large number of the improved game devices use, for fancy, new operational input means.

As such sophisticated and complicated game contents of game devices require various operations, it is not easy for players to learn their game operations.

In a case that the contents of a game is so complicated that one motion requires a string of game operations, even when a player who has learned its operation is sure that he has made correct operations, sometimes the operations are actually incorrect, and characters do not move as he expects. This puts stress on the player.

Such conventional game devices find it difficult to satisfy players by simple game contents, while as game contents become more sophisticated and complicated, it is difficult for players to correctly learn various game operations and make perfect operations. This gives stress to the players, and this is a problem.

SUMMARY OF THE INVENTION

A first object of the present invention is to provide a game device which makes game players free from stress and makes them readily familiar with complicated game operations.

A second object of the present invention is to provide a method of displaying a game which makes readily familiar with complicated game operations.

The above-described first object is achieved by a game device comprising operational input means for inputting operational signals produced by operation of a player of a game, game control means for controlling the game, based on the operational signals of the operational input means, and game display means for displaying the game controlled by the game control means, the game control means including operational display means for displaying in the game display means the operational signals inputted by the operational input means.

In the above-described game device, it is preferable that the operational display means comprises display element storing means for storing a plurality of display elements for displaying a plurality of operational signals supplied by the operational input means, and display element selecting means for selecting a display element to be displayed among said plurality of display elements stored in the display element storing means, based on an operational signal supplied by the operational input means.

In the above-described game device, it is preferable that the operational input means includes a first operational input means to be operated by a first player of the game, and a second operational input means to be operated by a second player of the game, and the display element stores means storing first display elements for displaying a plurality of operational signals supplied by the first operational input means, and second display elements for displaying a plurality of operational signals supplied by the second operational input means.

In the above-described game device, it is preferable that the operational input means includes a plurality of operational buttons to be operated by the player, and said plurality of display elements are arranged corresponding to a layout of the operational buttons of the operational input means.

In the above-described game device, it is preferable that the operational input means includes an operational mat for the player to stand on, and a plurality of sensors arranged around the operational mat for detecting the arms and legs of the player extended thereabove to input operational signals in accordance with motions of the arms and legs of the player, and said plurality of display elements are arranged corresponding to an arrangement of said plurality of sensors of the operational input means.

In the above-described game device, it is preferable that said plurality of display elements are displayed at a set position on a display screen for displaying the game.

In the above-described game device, it is preferable that the first display elements are displayed at a first set position on the side of a display screen for displaying the game where the first display operational input means is positioned, and the second display elements are displayed at a second set position on the side of the display screen where the second display operational input means is positioned.

In the above-described game device, it is preferable that the player operates his own character in the game to play the game, and said plurality of display elements follow the moving of the character on a display screen for displaying the game.

In the above-described game device, it is preferable that the first player operates a first character in the game to play the game, the second player operates a second character in the game to play the game, said first display elements follow the moving of the first character on a display screen for displaying the game, and said second display elements follow the moving of the second character on the display screen.

In the above-described game device, it is preferable that said plurality of display elements are displayed on a barrel part of the character.

In the above-described game device, it is preferable that said first display elements are displayed on a barrel part of the first character, and said second display elements are displayed on a barrel part of the second character.

The above-described second object is achieved by a method of displaying a game controlled based on operational signals produced by operation of a player of the game, the method further displaying the operational signals on a display screen for displaying the game.

In the above-described method, it is preferable that a plurality of display elements are stored for displaying a plurality of operational signals, and a display element to be displayed is selected among said plurality of display elements, based on an operational signal produced by operation of the player of the game.

In the above-described method, it is preferable that the game is controlled based on operational signals produced by operations of a first player and a second player of the game, said plurality of display elements comprise first display elements for displaying a plurality of operational signals produced by the first player, and second display elements for displaying a plurality of operational signals produced by the second player, and display elements to be displayed are selected among the first display elements and second display elements, based on operational signals produced by operations of the first player and the second player of the game.

In the above-described method, it is preferable that said plurality of display elements are arranged corresponding to a layout of a plurality of operational buttons which are operated by the player to input said plurality of operational signals.

In the above-described method, it is preferable that an operational mat is provided for the player to stand on, a plurality of sensors are arranged around the operational mat for detecting the arms and legs of the player extended thereabove to input operational signals in accordance with motions of the arms and legs of the player, and said plurality of display elements are arranged corresponding to an arrangement of said plurality of sensors.

In the above-described method, it is preferable that said plurality of display elements are displayed at a set position on a display screen for displaying the game.

In the above-described method, it is preferable that the player operates his own character in the game to play the game, and said plurality of display elements follow the moving of the character on a display screen for displaying the game.

In the above-described method, it is preferable that said plurality of display elements are displayed on a barrel part of the character.

According to the present invention, there is provided operational display means for displaying operational signals inputted by operation of operational input means by game player. The game player can confirm game operations they made. As a result, the game player can relatively readily see their game operations they made without stress given to them.

In the above-described game device, the operational display means includes display element storing means for storing a plurality of display elements indicative of a plurality of operational signals supplied by the operational input means, and display element selecting means for selecting a display element to be displayed among the plurality of display elements stored in the display element storing means, based on an operational signal supplied by the operational input means, whereby the operational signal inputted by the operation input means can be discriminatively confirmed.

In the above-described game device, there are provided as the operational input means, first operational input means which is operated by a first player of the game, and second operational input means which is operated by a second player of the game, and first display elements for displaying a plurality of operational signals supplied by the first operational input means, and second display elements for displaying a plurality of operational signals supplied by the second operational input means are stored by the element storing means, whereby the two operational input means can be discriminatively confirmed.

In the above-described game device, a plurality of display elements are arranged corresponding to an arrangement of operational buttons of the operational input means, whereby operational states of the operational input means can be readily seen.

In the above-described game device, in the case that the operational input means includes an operational mat for the player to stand on, and a plurality of sensors arranged around the operational mat for detecting the arms or legs of the player outwardly extended, the plural display elements are arranged corresponding to an arrangement of the plurality of sensors of the operational input means, whereby even if the operational input means is difficult to see operational states, operational signals can be seen without failure.

In the above-described game device, the plural display elements are set in position on the display screen for a game to be displayed, whereby operational states of the operational input means can be readily seen.

In the above-described game device, the first display elements are displayed at a first set position on the side of a display screen where the first operational input means is positioned, and the second display elements are displayed at a second set position on the side of the display screen where the second operational input means is positioned, whereby the two operational input means can be discriminatively confirmed.

In the above-described embodiment, in the case that the player operates his own character to play the game, a plurality of display elements follow the moving of the character on a display screen for displaying the game, whereby the game player only looks at motions of the character to readily see the operational signals he inputted. A plurality of display elements are displayed especially at a barrel part of the character, whereby the game player can very readily see his operational signals.

In the above-described game device, in the case that the first player operates a first character in the game to play the game, and that the second player operates a second character in the game to play the game, said first display elements follow the moving of the first character on a display screen for displaying the game, and said second display elements follow the moving of the second character on the display screen for displaying the game, whereby the first and second players only look at motions of the characters to readily see the operational signals. A plurality of display elements are displayed especially at a barrel part of the character, whereby the players can very readily see his operational signals.

According to the present invention, in a method of displaying a game controlled based on operational signals produced by operation of a player of the game, the operational signals are displayed on a display screen for displaying the game, whereby the player can readily see their game operations they made without stress given to them.

In the above-described method, a plurality of display elements are stored for displaying a plurality of operational signals, and a display element to be displayed is selected among said plurality of display elements, based on an operational signal produced by operation of the player of the game, whereby the operational signal inputted by the player can be discriminatively confirmed.

In the above-described method, in the case that the game is controlled based on operational signals produced by operations of a first player and a second player of the game, said plurality of display elements comprise first display elements for displaying a plurality of operational signals produced by the first player, and second display elements for displaying a plurality of operational signals produced by the second player, and display elements to be displayed are selected among the first display elements and second display elements, based on operational signals produced by operations of the first player and the second player of the game, whereby the operations of the first player and the second player can be discriminatively confirmed.

In the above-described method, the plurality of display elements are arranged corresponding to a layout of a plurality of operational buttons which are operated by the player to input said plurality of operational signals, whereby the operational states of the operational bottoms can be readily seen.

In the above-described method, in the case that an operational mat is provided for the player to stand on, and a plurality of sensors are arranged around the operational mat for detecting the arms and legs of the player extended thereabove to input operational signals in accordance with motions of the arms and legs of the player, the plurality of display elements are arranged corresponding to an arrangement of said plurality of sensors, whereby even if the operation is difficult to see operational states, operational signals can be seen without failure.

In the above-described method, the plurality of display elements are displayed at a set position on a display screen for displaying the game, whereby operational states of the player can be readily seen.

In the above-described method, in the case that the player operates his own character in the game to advance the game, the plurality of display elements follow the moving of the character on a display screen for displaying the game, whereby the player only looks at motions of the character to readily see the operational signals he inputted. A plurality of display elements are displayed especially at a barrel part of the character, whereby the players can very readily see his operational signals.

DETAILED DESCRIPTION OF THE INVENTION

The game device according to a first embodiment of the present invention will be explained with reference to FIGS. 1 to 3B.

Figure 1:
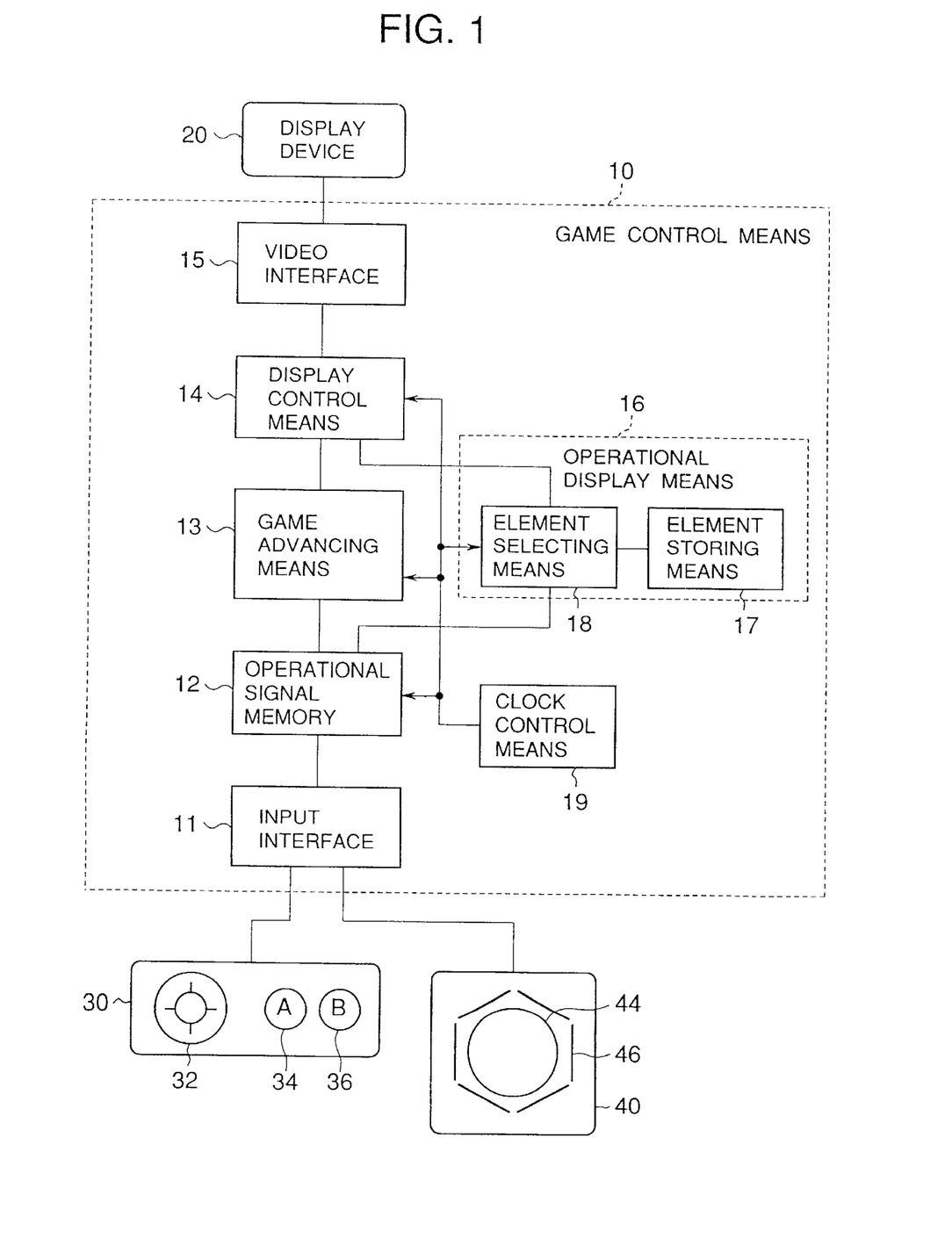
FIG. 1 is a block diagram of the game device according to a first embodiment of the present invention.

The game device according to the first embodiment, as shown in FIG. 1, comprises game control means 10 for controlling a game. The game control means 10 is connected to a display device 20 for displaying the game to be controlled. The game control means 10 is further connected to a conventional controller 30 as operational input means for inputting operational signals indicative of operations made by a game player, and a light harp 40 as innovational operational input means.

The controller 30 includes a joy stick 32 having four switching elements or buttons 32a to 32d for inputting signals indicative of operational directions, and an A button 34 and a B button 36 for inputting signals indicative of selected operations.

Figure 2:
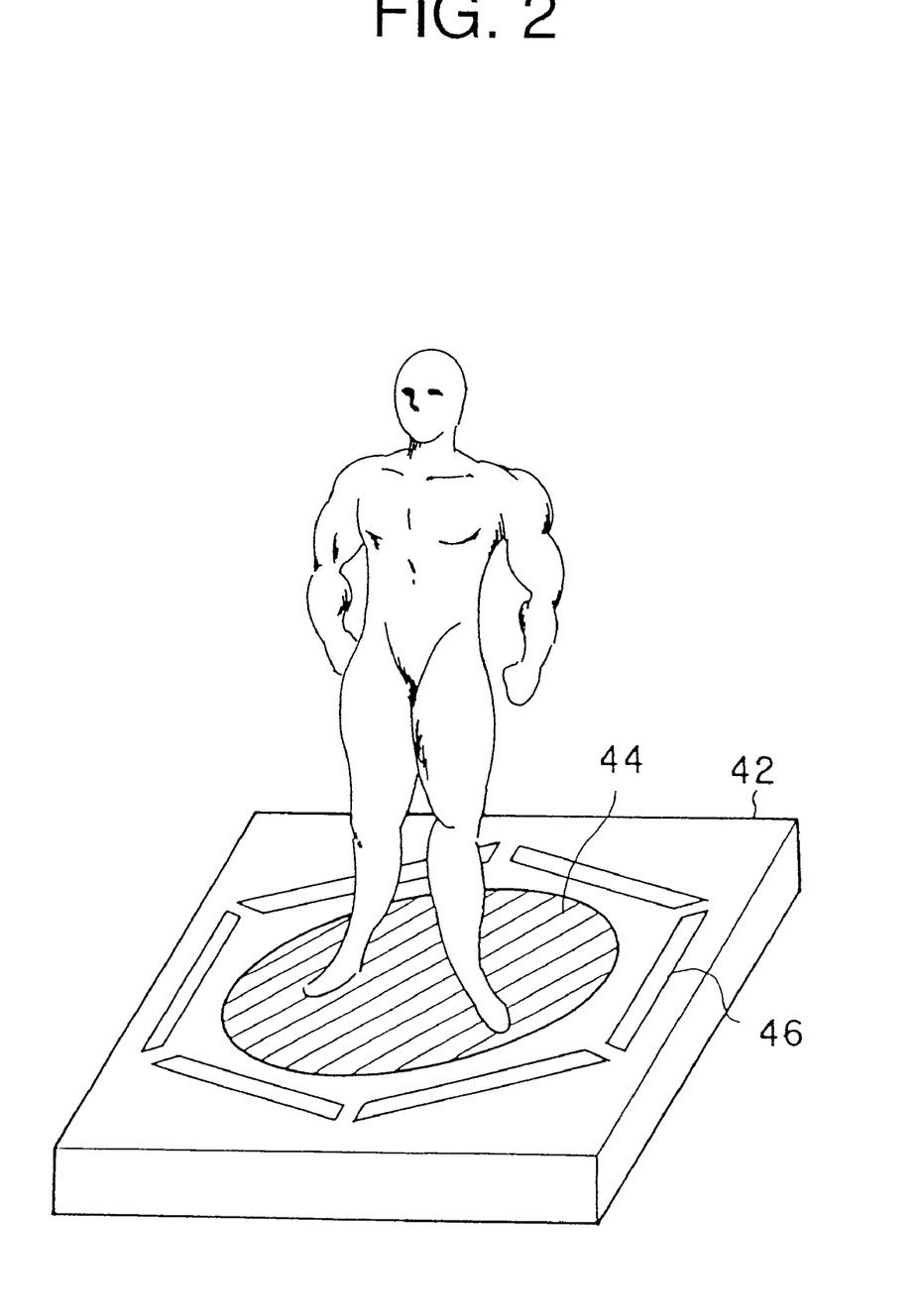
FIG. 2 is an explanatory view of the light harp used in the first embodiment of the present invention.

Differently from the conventional operational input means, such as a controller, etc., a game player bodily uses the light harp 40 to input signals thereto. As shown in FIG. 2, the light harp 40 comprises an operational mat 44 provided at the center thereof for detecting presence of a game player thereon, and 6 infrared ray sensors 46 provided around the operational mat 44. A game player stands on the operational mat 44 and extends his arms and legs above the infrared ray sensors 46. The infrared ray lamps 46 detect block of the infrared rays by their reflection against the arms and the legs. The operational mat 44 is off while a game player is thereon and is turned on when the game player jumps on the operational mat 44. The light harp 40 works as switch elements responding to movement of the game player.

The game control means 10 is connected to operational input means, such as the controller 30 and the light harp 40, through an input interface 11. Operational signals from the operational input means are stored in an operational signal memory 12.

To advance a game based on a game program there is provided game advancing means 13. The game advancing means 13 advances the game in response to the operational signals stored in the operational signal memory 12 and outputs advancing states to the display control means 14.

The display control means 14 controls game displays to be displayed in accordance with advancing states of a game outputted by the game advancing means 13. Video display signals indicative of game displays are outputted to the video display device 20 through a video interface 15.

The game control means 10 includes operational display means 16 for displaying elements simulating input means, such as the controller 30, light harp 40 or the like on display monitor device 20.

Figure 5:
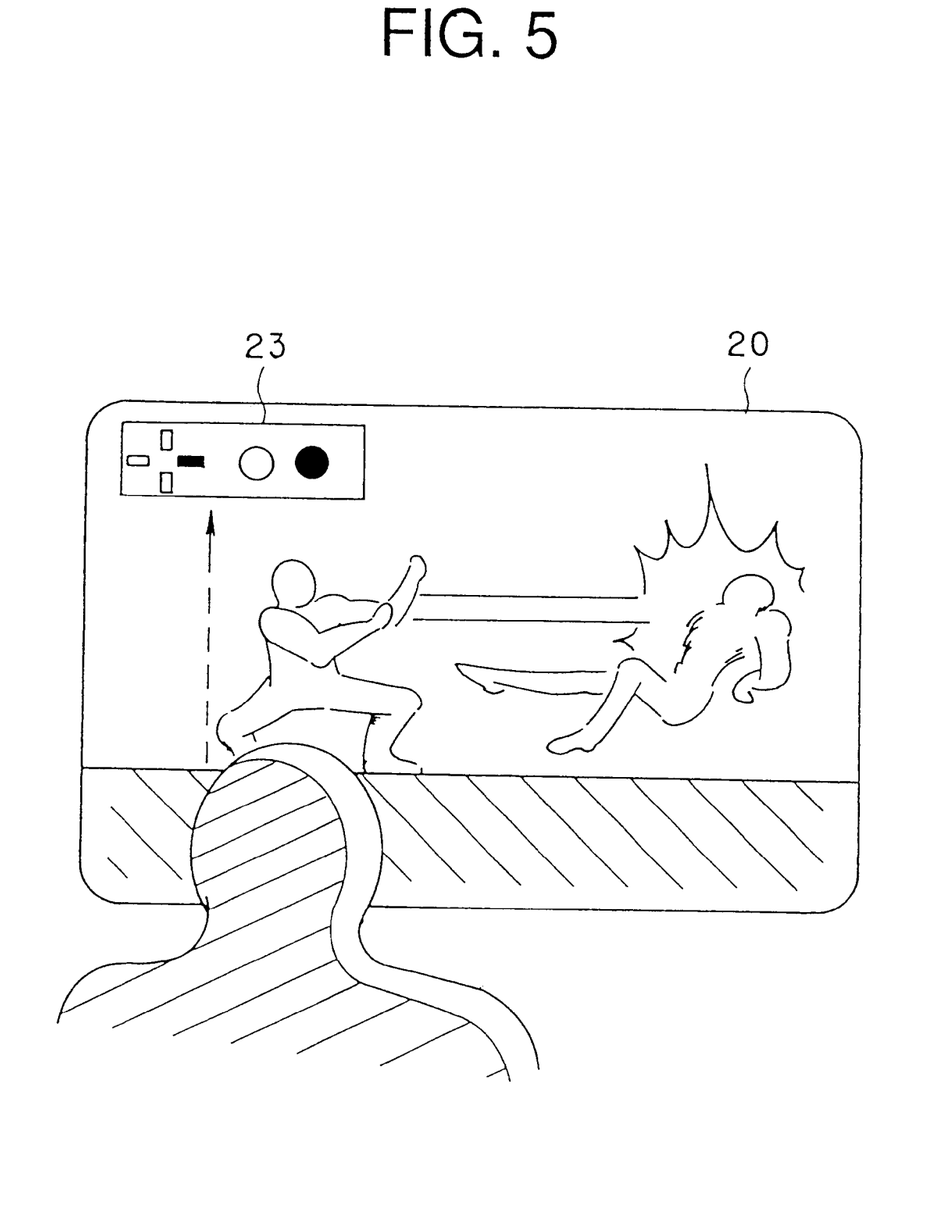
FIG. 5 is an explanatory view of a first display example of the game device according to the second embodiment of the present invention.

The operational display means 16 includes element storing means 17 for storing signal data for displaying a plurality of display elements, for example, 23a to 23f as shown in FIG. 5, simulating a plurality of switching elements, for example, 32a to 32d, 34 and 36 as shown in FIG. 1, of the operational input means, such as the controller 30, the light harp 40, etc., and element selecting means 18 for selecting a display element to be displayed among the plurality of display elements stored in the element storing means 17. A layout and shapes of a plurality of display elements are disposed so as to simulate the switching elements or buttons of the operational input means. Examples of the display elements will be described later.

The game control means 10 includes clock control means 19 for synchronization. Synchronization signals from the clock control means 19 are inputted to the operational signal memory 12, the game advancing means 13, the display control means 14 and the element selecting means 18.

The element selecting means 18 outputs from the element storing means 17 to the display control means 14, in synchronization with a start of a vertical blanking period for the video display, signals for displaying selected elements, for example, 23b and 23f in FIG. 5, or changing colors of the display elements 23d and 23f based on the operational signals stored in the operational signal memory 12. The selected elements are displayed on a video frame following the end of the vertical blanking period. Thus display control is conducted in response to the operational signals during a vertical blanking period for the video display.

Figure 3A:
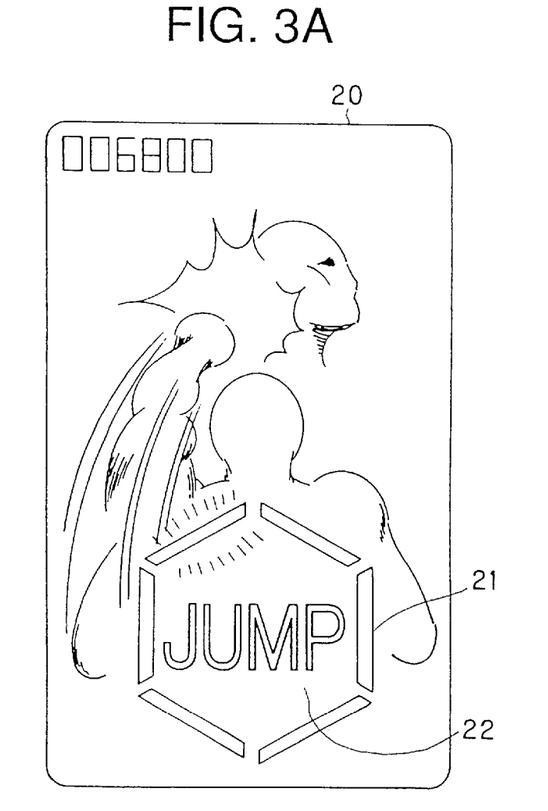
FIGS. 3A and 3B are views explaining motions of the game device according to the first embodiment of the present invention.

It is difficult using the light harp 40 as the operational input means for a human eye to sense what motion of a player supplies operational inputs. In the present embodiment, as shown in FIG. 3A, a plurality of display elements indicative of operational input states of the light harp 40 are set on the display monitor screen of the video display device 20.

That is, on the display monitor screen of the display device 20 there are displayed six (6) segments 21 arranged in a hexagon and display letters "JUMP" 22, which are arranged correspondingly to a layout of the operational mat 44 and the 6 infrared ray sensors 46. When the infrared ray sensors 46 are turned on by operations of a game player, display segments 21 corresponding to the infrared ray sensors 46 change colors or flashes. When a game player jumps, and operational signals are supplied by the operational mat 44, the display letters 22 change colors, or flashes.

Next, the operation of the game device according to the present embodiment will be explained.

When a game is started in response to a start operational signal of the controller 30, operational signals are transmitted from the controller 30 and the light harp 40 to the operational signal memory 12 through the input interface 11 and stored in the memory 12.

The game advancing means 13 advances the game in accordance with the operational signals stored by the operational signal memory 12, based on a program of the game and outputs advancing states of the game to the display control means 14. The display control means 14 controls game generation of video signals to be displayed on the display device 20 in response to advancing states of the game outputted from the game advancing means.

When a game player standing on the operational mat 44 of the light harp 40 extends outward his arms or legs, infrared ray sensors 46 corresponding to the extended arms or legs are turned on, and operational signals are inputted. These operational signals are stored in the operational signal memory 12.

The element selecting means 18 selects, based on the operational signals stored in the operational signal memory 12, a display segment 21 corresponding to the turned on infrared ray sensor 46 among the 6 display segments 21 and display letters 22 stored by the element storing means 17. The selected display segment 21 is displayed on the display device 20 by the display control means 14 such that the selected display segments 21 change colors or flash.

Figure 3B:
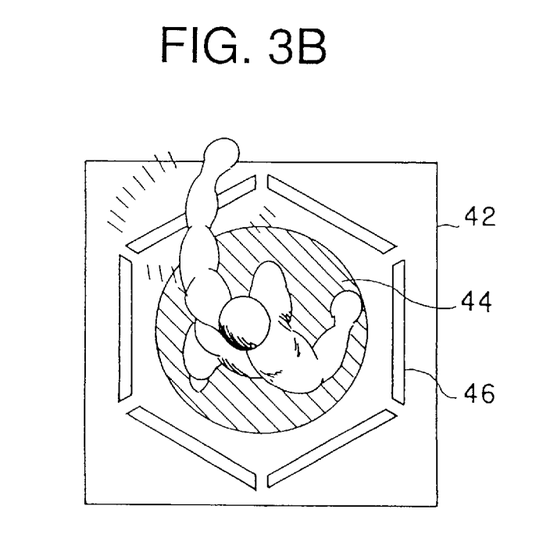

For example, as shown in FIG. 3B, when a game player extends the left arm to block the upper left infrared ray sensor 46 thereabove, a character on the display screen of the display device 20 is punching an opponent with the left arm, and the upper left display segment of the display segments 21 at the lower part of the display screen changes colors or flashes.

When the game player jumps on the operational mat 44, the operational mat 44 outputs operational signals. These operational signals are stored in the operational signal memory 12.

The element selecting means 16 selects display letters 22 stored by the element storing means 17, which correspond to the turned on operational mat 44. The selected display letters 22 are displayed on the display device 20 by the display control means 14 so that the selected display letters 22 change colors or flash.

Thus according to the present embodiment, a game player can enjoy a game while visually confirming his operational states on the display screen. Accordingly the player can accurately understand necessary operations of innovational operational input means, such as the light harp, without confusion. As a result, stresses which may be given to the game player are decreased.

The game device according to a second embodiment of the present invention will be explained with reference to FIGS. 4 to 7B. Common members of the second embodiment with the first embodiment are represented by common reference numerals not to repeat their explanation or to simplify their explanation.

Figure 4:
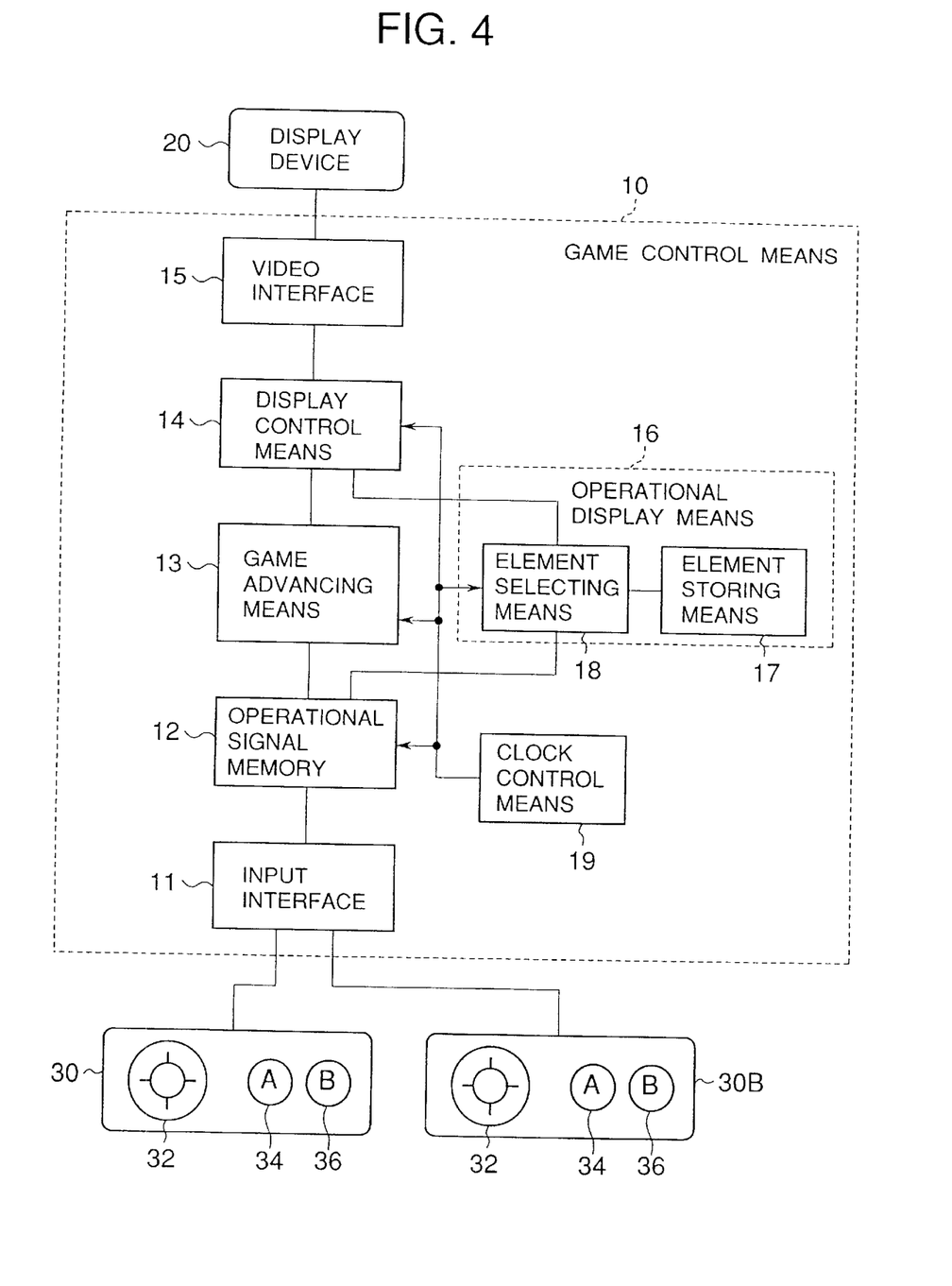
FIG. 4 is a block diagram of the game device according to a second embodiment of the present invention.

As shown in FIG. 4, the game device according to the second embodiment is connected to a display device 20 which displays a game controlled by game control means 10 for controlling a game, and to two controllers 30A, 30B as operational input means. This game can be played by two players who manipulate the controllers 30A and 30B, respectively, and operational signals indicative of operations of a game players are supplied to the game control means.

The controllers 30A, 30B each includes a joy stick 32 for inputting operational directions, and an A button 34 and a B button 36 for inputting selecting operations.

Separate groups of display elements may be displayed on the display monitor device 20 correspondingly to the pair of controllers 30A and 30B and selected display elements are selectively displayed on changing colors or flashing in response to the manipulations by the players of the switching elements or buttons. A set of data for displaying the display elements are stored in the element storing means 17 so that layouts and shapes of the display elements simulate controllers 30A and 30B.

Examples of display of the operational display elements will be explained with reference to FIGS. 5 to 7B.

FIG. 5 shows a first display example that one game player plays a game using the controller 30A. A controller display region 23 is provided at a set position at an upper left part of the display screen of the display device 20.

There are shown in the controller display region 23 on display device 20 as shown in FIG. 5 a set of elements 23a to 23d disposed in a cross and a pair of elements 23e and 23f a layout of which simulates to an arrangement of the joy stick 32 and the operational buttons 34, 36 of the controller 30A. Elements 23b displayed by changing color indicate that the player has selected the switch elements 32b and 36.

A game player plays a game operating the controller 30A, and he looks at the controller display region 23 at the upper left part of the display screen as required to visually confirm operations he made. Thus game players can readily see relationships between operational states and motions of characters, which enables game players to enjoy games under no stress.

Figure 6:
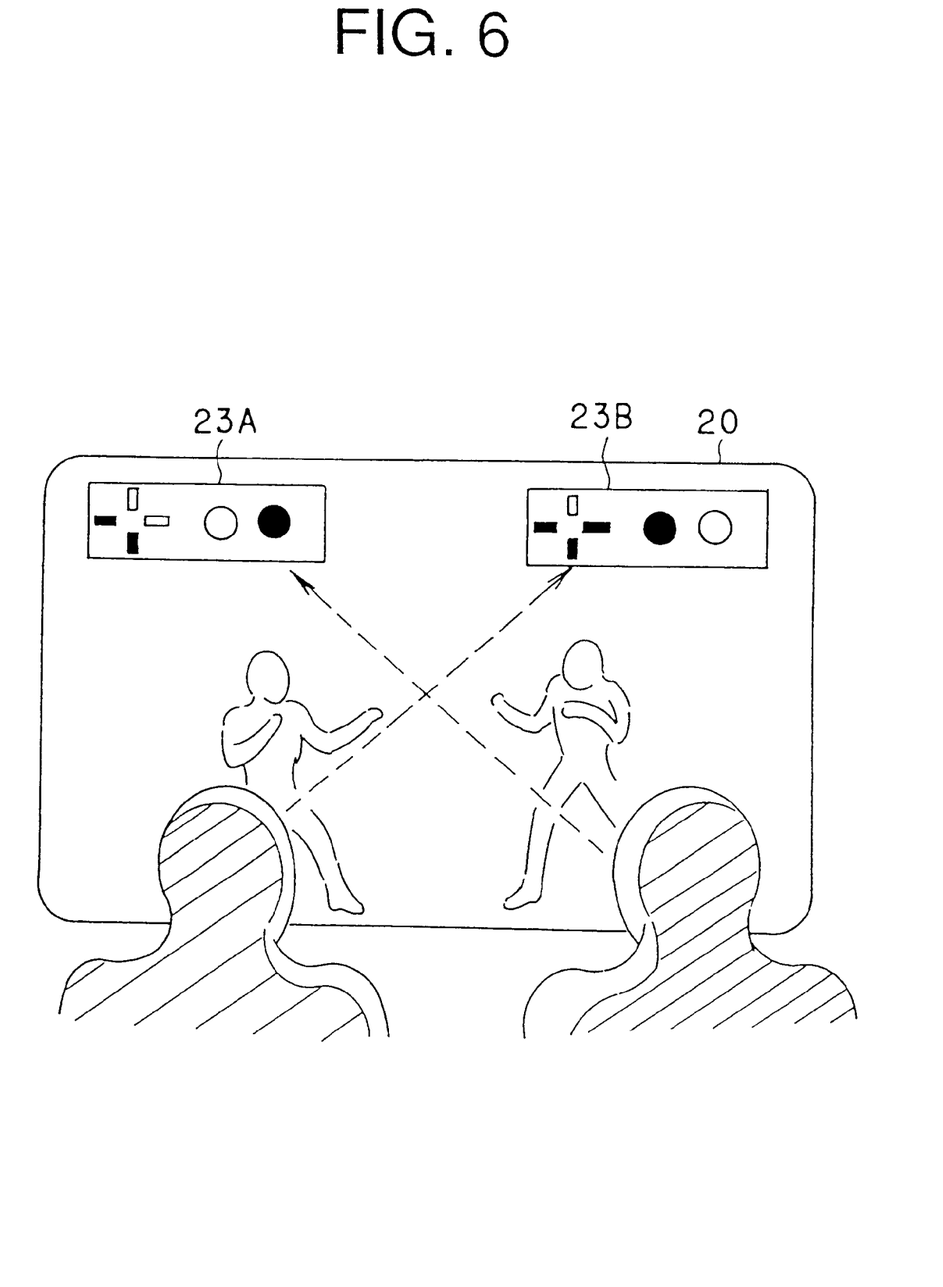
FIG. 6 is an explanatory view of a second display example of the game device according to the second embodiment of the present invention.

FIG. 6 shows a second display example that two game players play a game. Controller display regions 23A, 23B are provided at set positions at upper left and right parts of the display screen of the display device 20. Display positions of the controller display regions 23A, 23B correspond to positions of the controllers 30A, 30B.

Elements 23a, 23d and 23f displayed by changing color in the region 23A indicate that the player at the left hand has selected operational direction switches 32a and 32d of joy stick 32 and button B 36 of the controller 30A shown in FIG. 4. Similarly, elements 23a, 23d and 23e displayed by changing color in the region 23B indicate that the player at the right hand has selected.

One of the game players operates the controller 30A, and the other operates the controller 30B to play a game. The game players look at the controller display regions 23A, 23B of the display screen as required to visually confirm selected operational signals. Especially in a game played by two game players, the players can visually confirm not only their own operational states, but also operational states of the other, which permits the game players to take into account operational states of the other. As a result, sophisticated and very amusing games can be played.

Figure 7A:
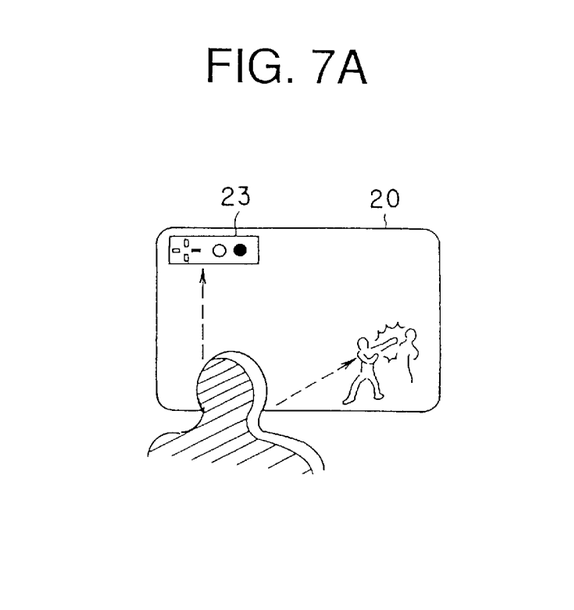
FIGS. 7A and 7B are explanatory views of a third display example of the game device according to the second embodiment of the present invention.
Figure 7B:
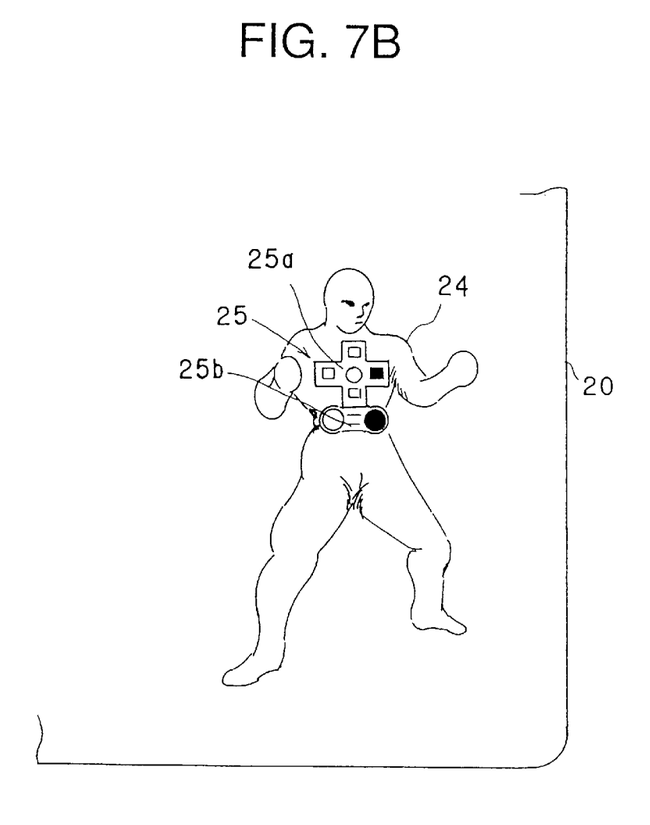

FIGS. 7A and 7B show a third example which is an improvement of the examples of FIGS. 5 and 6. In the examples of FIGS. 5 and 6, as shown in FIG. 7A, display elements to be displayed in response to operational signals of the controllers 30A, 30B are displayed at set positions on the display screen of the display device 20. In this case, game players must pay attention to both motions of characters and displays on the controller display regions 23. As a result the game players can not concentrate and fail to make suitable operations.

As a countermeasure, for a game in which game players operate their own characters to play the game, the controller display regions are arranged to follow the moving characters.

As exemplified in FIG. 7B, the controller display region 25 is superposed on the character 24. The controller display region 25a which contains four display elements 25a1 to 25a4 arranged correspondingly to direction switches 32a to 32d of the joy stick 32 is displayed on an upper part of a shirt worn by the character 24, and the controller display region 25b which contains display elements 25b1 and 25b2 arranged correspondingly to the button A 34 and the button B 36 is displayed on lower parts of the shirt.

The controller display region 25 thus follows the character 24 on the move, whereby game players can pay attention concurrently to the character 24 and the controller display region 25, so that they can enjoy games, confirming without failure input states of operational signals.

The present invention is not limited to the above-described embodiments and covers other modifications and variations.

For example, the above-described embodiments use the controllers and the light harp as operational input means but may use other kind of operational input means. The present invention is effectively applicable especially to innovational operational input means.

The present invention may be applicable to game devices using three or more controllers, etc. as operational input means.

The present invention may be applied to communication game devices in which game deices are mutually connected by communication cables or others, and operational input signals of operational input means of the other game devices may be displayed on the display screen.

The above-described embodiments are applied to game devices used in game centers for explanation but may be applied to domestic game devices.

What is claimed is:

1. A game device comprising:

means for displaying at least one game character and its associated movement on a monitor screen;

an input means having a plurality of manipulation switch elements;

control means for controlling movement of said at least one game character in response to the manipulation by a player of the switch elements of said input means and producing a signal for display by said means for displaying; said means for displaying, in addition to displaying the game character and the movement thereof caused by manipulation of said input means, also emphatically displaying an indication representing how the switch elements of said input means are being manipulated by a player to control movements of said at least one game character.

2. A game device comprising:

a control means for controlling progress of a game;

means for displaying at least one game character and its associated movement on a monitor screen;

an input means with a plurality of manipulation switch elements;

control means for controlling actions of said at least one game character in response to the manipulation by a player of the switch elements of said input means;

said means for displaying, in addition to displaying the game character and the movement thereof caused by manipulation of said input means, also emphatically displaying on the monitor screen an indication of how the switch elements of the input means are being manipulated by a player to control movement of said at least one game character while the game is being played.

3. A game device comprising:

a control means for controlling progress of a game;

an input means functionally connectable to said control means and having a plurality of switch elements for supplying said control means with manipulation signals in response to manipulation by a player of the switch elements;

means for displaying on a monitor screen at least one game character;

means for displaying on the monitor screen display elements which correspond to switch elements of an input means, while the game is in play; and means for controlling actions of said one of the game characters in response to input signals from the input means.

4. A game device of claim 3, wherein said display element displaying means operates to display a selected one of the display elements in response to manipulation of a corresponding switch element.

5. A game device of claim 4, wherein said display element displaying means operates so that said plurality of display elements are disposed so as to simulate a plurality of switch elements of the input means and so as to display emphatically one of said display elements in response to manipulation by a player of a switch element corresponding to said one display element.

6. A game device comprising:

a control means for controlling progress of a game;

a pair of input means functionally connectable to said control means and each having a plurality of switch elements for supplying said control means with manipulation signals in response to manipulation by a player of the switch elements;

means for displaying on a monitor screen a pair of game characters respectively controlled by said pair of input means;

means for displaying a pair of display regions each with a plurality of display elements corresponding to the switch elements of a respective input means; and means for controlling movement of said game characters in response to input signals from respective input means.

7. A game device comprising:

a control means for controlling progress of a game;

means for displaying on a monitor screen a game character and a region containing display elements corresponding to switch elements of a manipulation controller connectable to said control means; and means for emphasizing one of said display elements in concert with movements of the game character in response to manipulation of said switch elements.

8. A game device of claim 7, wherein said one of said display elements is emphasized by flashing.

9. A game device of claim 7, wherein said one of said display elements is emphasized by changing color.

10. A game device for playing a game comprising:

a control means for controlling progress of a game;

an input means functionally connectable to said control means and having a plurality of switch elements for supplying said control means with manipulation signals in response to manipulation by a player of the switch elements;

means for displaying at least one game character on a monitor;

means for displaying on the monitor a display element corresponding to a switching element of said input means so as to be displayed with emphasis in concert with a movement of one of the game characters enabling a player to see the emphatically displayed display element while the player is playing a game and manipulating said switching element.

11. A game device for playing a game, said game device comprising:

a game controller, said game controller displaying first images associated with the game to a player, the first images comprising at least first indicators representing at least an operation of input elements of an input device used to play the game, the displayed first indicators providing information useful to the player to enable the player to play the game, said game controller inputting signals from an input device operated by the player, the input signals representing manipulations of input elements of the player operated input device, and said game controller displaying, in response to the input signals, second images associated with the game to the player, the second images changing in response to the manipulations of the input elements of the player operated input device.

12. The game device of claim 11 wherein the second images comprise at least second indicators representing the input elements manipulated by the player.

13. The game device of claim 11 wherein the second images comprise at least second indicators representing the input elements manipulated by the player and at least one game character under the control of the player.

14. The game device of claim 13 wherein the game character is manipulated in accordance with the input signals representing the manipulations of the input elements of the player operated input device.

15. The game device of claim 14 wherein the second indicators are displayed in concert with the manipulation of the game character in response to the input signals.

16. The game device of claim 11 wherein the first indicators are displayed on a first region of a display device electrically coupled to the game device and second indicators are displayed on a second different region of the display device.

17. The game device of claim 11 further comprising a hand held game controller coupled to said game controller, wherein the input device being operated by the player is said hand held game controller.

18. The game device of claim 11 further comprising an operational mat in which the player stands on coupled to said game controller, wherein the input device being operated by the player is said operational mat.

19. The game device of claim 11 wherein the input elements comprise switch elements.

20. The game device of claim 11 wherein the first indicators comprise input elements of the player operated input device and input elements of a second player operated input device.

21. A game device to play a game, said game device comprising:

a game controller, said game controller displaying first images associated with the game to a player, the first images comprising at least first indicators providing information useful to the player for subsequent manipulation of second input elements being operated by the player, and displaying second images associated with the game to the player, the second images comprising at least second indicators representing how the second input elements are manipulated by the player.

22. The game device of claim 21 wherein the second images are displayed in response to the input of signals representing manipulation of the second input elements by the player made while viewing the first images.

23. The game device of claim 21 wherein the second images further comprise at least one game character under the control of the player.

24. The game device of claim 23 wherein the game character is manipulated in accordance with the input signals representing the manipulations of the second input elements.

25. The game device of claim 24 wherein the second indicators are displayed in concert with the manipulation of the game character in response to the input signals.

26. The game device of claim 21 wherein the first indicators are displayed on a first region of a video device coupled to the game device and the second indicators are displayed on a second different region of the video device.

27. The game device of claim 21 further comprising a hand held game controller coupled to said game controller, wherein the input device being operated by the player is said hand held game controller.

28. The game device of claim 21 further comprising an operational mat in which the player stands on coupled to said game controller, wherein the input device being operated by the player is said operational mat.

29. A game device comprising:

a game controller, a display device coupled to said game controller, and a first and a second input devices each having a plurality input elements and coupled to said game controller, said game controller displaying on said display device images associated with a game, said images comprising a first set of indicators corresponding to the input elements of said first input device and a second set of indicators corresponding to the input elements of said second input device;

said game controller being input with signals from the first and second input devices, the input signals representing manipulations of the input elements of the first and second input devices, said game controller displaying on said display device, in response to the input signals, how the first and second input devices are being manipulated by emphatically depicting ones of said indicators in response to the manipulations of the input elements of the first and second input devices.

30. The game device of claim 29 wherein said images further comprise first game character and second game character, wherein said first game character is manipulated in accordance with the input signals representing the manipulations of the input elements of the first input device and said second game character is manipulated in accordance with the input signals representing the manipulations of the input elements of the second input device.

31. The game device of claim 30 wherein said first set of indicators are displayed in concert with the manipulation of the first game character in response to the input signals supplied from said first input device and said second set of indicators are displayed in concert with the manipulation of the second game character in response to the input signals supplied from said second input device.

32. The game device of claim 29 wherein the first set of indicators are displayed on a first region of a display screen of said display device and the second set of indicators are displayed on a second different region of the display screen of said display device.

33. The game device of claim 29 wherein said first and second input devices comprise hand held input devices.

34. The game device of claim 29 wherein said first and second input devices comprise an operational mat.

35. The game device of claim 29 wherein said plurality of input elements on said first and second input devices comprise switch elements.

36. The game device of claim 29 wherein the first input device is operated by a first player and the second input device is operated by a second player.

37. A game device comprising:

a game controller, a display device coupled to said game controller, and first and second input elements coupled to said game controller, said game controller displaying on said display device first images associated with a game to a player, the first images comprising at least first indicators representing an indication of how the first input elements are being manipulated by a player, the first indicators providing information useful to the player for subsequent manipulation of the second input elements operated by the player.

38. The game device of claim 37 wherein the second images are displayed in response to the input of signals representing manipulation of the second input element by the player made while viewing the first images.

39. The game device of claim 37 wherein the second images further comprise at least one game character under the control of the player.

40. The game device of claim 39 wherein the game character is manipulated in accordance with the input signal representing the manipulations of the second input elements.

41. The game device of claim 40 wherein second indicators representing an indication of how the second input elements are being manipulated by the player are displayed in concert with the manipulation of the game character in response to the input signals.

42. The game device of claim 37 wherein the first indicators are displayed on a first region of the display device and the second indicators are displayed on a second different region of the display device.

43. The game device of claim 37 further comprising a hand held game controller coupled to said game controller, wherein the first input elements being operated by the player are formed on said hand held game controller.

44. The game device of claim 37 further comprising an operational mat which the player stands on coupled to said game controller, wherein the second input elements being operated by the player are formed with said operational mat.

45. A game apparatus comprising:

a game controller;

a monitor having a display screen and coupled to said game controller; and a first and a second input devices coupled to said game controller, each of the input devices having a plurality of input elements, wherein said game controller displays on said display screen first and second images associated with a game, wherein said first images display on the display screen an indication of how the first input elements are being manipulated while the game is being played, and wherein said second images display on the display screen an indication of how the second input elements are being manipulated while the game is being played so as to be referred to by a player operating said first input device.

46. A game apparatus comprising:

a game controller;

a monitor having a display screen and coupled to said game controller; and a first and a second input devices coupled to said game controller, each of the input devices having a plurality of input elements, wherein said game controller displays on said display screen first and second images associated with a game, wherein said first images change in response to manipulations of the input elements of said first input device manipulated by a first player, wherein said second images change in response to manipulations of the input elements of said second input device manipulated by a second player, wherein said first and second images include indicators depicting operations of the input elements of said first and second input devices, respectively, so as to be referred to by the players.

47. A game apparatus comprising:

a game controller;

a monitor having a display screen and coupled to said game controller so as to display on said display screen images associated with a game while the game is being played; and first and second input devices coupled to said game controller, each of the input devices having a plurality of input elements, wherein said images displayed on said screen includes a first set of indicators corresponding to said plurality of input elements on said first input device and a second set of indicators corresponding to said plurality of input elements on said second input device, wherein said game controller is supplied with signals from the first and second input devices, the input signals representing manipulations of the input elements of the first and second input devices, wherein, when one of said input elements is manipulated, an indicator corresponding to the manipulated input element is emphatically displayed on said screen in response to the input signal representing the manipulation of the manipulated input element.

48. A game appratus of claim 47, wherein said first set of indicators is displayed at the upper left side of the display screen and said second set of indicators is displayed at the upper right side of the display screen.

49. A game apparatus of claim 47, wherein the indicator corresponding to the manipulated input element is emphatically displayed by changing its color.

50. A game apparatus of claim 47, wherein the indicator corresponding to the manipulated input element is emphatically displayed by flashing the indicator.

* * * * *